United States Patent
Mahmoudi et al.

(10) Patent No.: US 9,748,847 B2
(45) Date of Patent: Aug. 29, 2017

(54) CIRCUITS AND METHODS PROVIDING HIGH EFFICIENCY OVER A WIDE RANGE OF LOAD VALUES

(71) Applicant: QUALCOMM Incorporated, San Diego, CA (US)

(72) Inventors: Farsheed Mahmoudi, San Diego, CA (US); James Thomas Doyle, Carlsbad, CA (US); Chuang Zhang, San Diego, CA (US); Zhengming Fu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 14/863,269

(22) Filed: Sep. 23, 2015

(65) Prior Publication Data

US 2016/0118895 A1  Apr. 28, 2016

Related U.S. Application Data

(60) Provisional application No. 62/067,897, filed on Oct. 23, 2014.

(51) Int. Cl.
| | |
|---|---|
| *H02M 3/158* | (2006.01) |
| *H02M 1/088* | (2006.01) |
| *G06F 1/32* | (2006.01) |
| *H02M 3/157* | (2006.01) |
| *H02M 1/00* | (2006.01) |

(52) U.S. Cl.
CPC ........ *H02M 3/1584* (2013.01); *G06F 1/3296* (2013.01); *H02M 1/088* (2013.01);
(Continued)

(58) Field of Classification Search
CPC .................................................. H02M 3/1584
See application file for complete search history.

(56) References Cited

U.S. PATENT DOCUMENTS

| | | | |
|---|---|---|---|
| 8,558,521 | B2 | 10/2013 | Chang et al. |
| 8,624,425 | B2 | 1/2014 | Feng et al. |

(Continued)

FOREIGN PATENT DOCUMENTS

EP     1578010 A2     9/2005

OTHER PUBLICATIONS

"AN2842 Application Note Paralleling of Power MOSFETs in PFC Topology Contents," Jul. 31, 2009 (Jul. 31, 2009), XP055183678, Retrieved from the Internet: URL;http://www.st.com/web/en/resource/technical/document/application_note/CD00214013.pdf—[retrieved on Apr. 16, 2015].

(Continued)

*Primary Examiner* — Albert Wang
(74) *Attorney, Agent, or Firm* — Haynes and Boone, LLP (57) ABSTRACT

An apparatus and method are disclosed for providing efficient operation in a feedback loop having a synchronous buck converter. The synchronous buck converter includes a plurality of individually selectable phases, where each of the phases has a plurality of individually selectable and parallel switching legs. The circuit stores information that associates multiple different load values with respective configuration settings that each define a number of phases and a number of switching legs. As the load changes, the circuit measures the load and selects an appropriate configuration setting. The circuit applies the selected configuration setting to operate the number of phases and a number of parallel switching legs in the buck converter.

30 Claims, 4 Drawing Sheets

(52) U.S. Cl.
CPC .... *H02M 3/157* (2013.01); *H02M 2001/0048* (2013.01); *H02M 2001/0054* (2013.01); *Y02B 70/1491* (2013.01)

(56) References Cited

U.S. PATENT DOCUMENTS

| | | | |
|---|---|---|---|
| 8,912,773 B2 | 12/2014 | Parto et al. | |
| 2004/0008016 A1* | 1/2004 | Sutardja | H02M 1/088 323/283 |
| 2005/0212497 A1* | 9/2005 | Cha | H02M 3/1584 323/272 |
| 2009/0153109 A1* | 6/2009 | Koertzen | G05F 1/10 323/268 |
| 2009/0224731 A1 | 9/2009 | Tang et al. | |
| 2011/0309054 A1 | 12/2011 | Salsich | |
| 2013/0061065 A1* | 3/2013 | Richards | G06F 1/26 713/300 |
| 2013/0176015 A1 | 7/2013 | Sato et al. | |
| 2014/0253066 A1 | 9/2014 | Teh | |
| 2014/0347899 A1 | 11/2014 | Banhamhall et al. | |

OTHER PUBLICATIONS

International Search Report and Written Opinion—PCT/US2015/052042—ISA/EPO—dated Dec. 23, 2015.
Second Written Opinion from International Application No. PCT/US2015/052042, dated Oct. 4, 2016, 10 pages.

* cited by examiner

CIRCUITS AND METHODS PROVIDING HIGH EFFICIENCY OVER A WIDE RANGE OF LOAD VALUES

CROSS REFERENCE TO RELATED APPLICATIONS

The present application claims priority to and the benefit of the U.S. Provisional Patent Application No. 62/067,897, filed Oct. 23, 2014, which is hereby incorporated by reference in its entirety.

TECHNICAL FIELD

This application relates to voltage converters and, more specifically, to feedback control of synchronous buck converters.

BACKGROUND

Some conventional voltage converter systems include multiple buck converters arranged in parallel to provide current to a load. In general, as the load draws more current the voltage converter may activate more buck converters, and as the load draws less current the voltage converter may activate fewer buck converters. In some examples, the parallel buck converter circuits may be referred to as phases and the voltage converter referred to as a multi-phase buck converter.

Energy efficiency of such systems may be defined, for example, as input current divided by output current, where a value of one would be 100% efficiency. Various conventional voltage converters show different efficiencies at different load currents. Furthermore, while some conventional systems may activate more of the buck converters to handle more current, simply activating more buck converters for a given amount of power consumption may not increase efficiency and, in fact, may decrease efficiency in some scenarios. Accordingly, there is a need to increase efficiency of a multi-phase buck converter over a wide range of load values.

DETAILED DESCRIPTION

Disclosed herein are embodiments of a circuit and a method for providing a high level of efficiency over a wide range of loads using pulse width modulation (PWM). A feedback loop includes a synchronous buck converter that has multiple phases and each phase has multiple switching legs. It is known beforehand which combinations of legs and phases provide higher levels of efficiency for a given load value. As the feedback loop operates and as the load value changes, current sensors feed back a value of the current (a proxy for the load) to a controller which selects a number of switching legs and phases appropriate for that particular load value.

Figure 1:
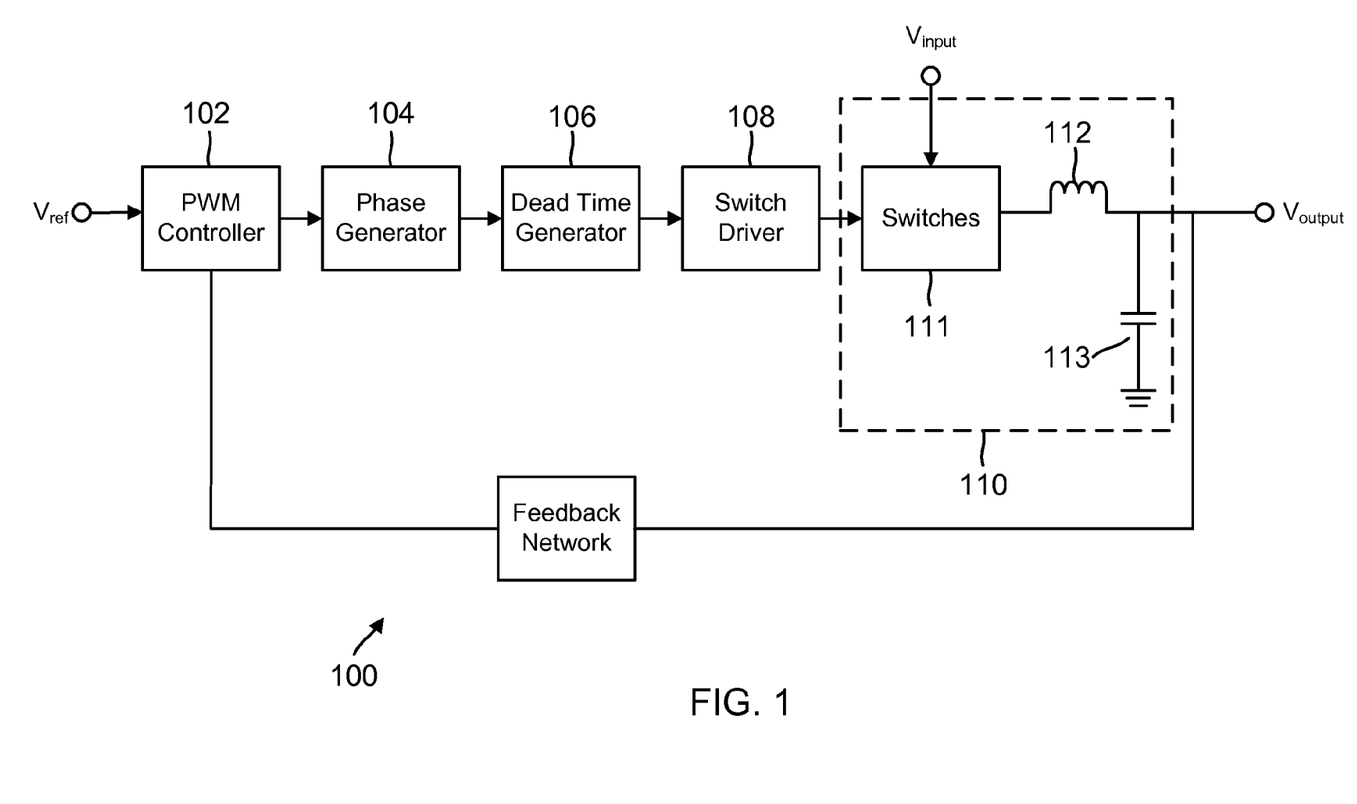
FIG. 1 is an architectural diagram illustrating an example feedback loop for providing a constant, or nearly constant, output voltage.

FIG. 1 is an architectural diagram illustrating an example feedback loop for providing a constant, or nearly constant, Voutput. PWM controller 102 receives a reference voltage (Vref) and a feedback signal providing a value of Voutput and outputs a PWM signal in response to a difference between Vref and Voutput. The PWM controller 102 modulates the PWM signal by adjusting the duty cycle of the PWM signal. In general, a larger duty cycle of the PWM signal increases a voltage at the output of synchronous buck converter 110, and a smaller duty cycle of the PWM signal decreases a voltage at the output of synchronous buck converter 110. In this way, PWM controller 102 continually adjusts the duty cycle of the PWM signal to keep Voutput nearly constant.

Phase generator 104 receives the PWM signal from PWM controller 102 and processes the PWM signal by adjusting its phase or producing multiple different signals with different phases. For instance, phase generator 104 may produce different signals for coupled inverters or may produce different signals for a multi-phase buck converter. As discussed in detail with respect to FIG. 2, circuits 102 and 104 may be provided as part of a centralized controller, and circuits 106, 108, and 110 illustrate a single phase of a multi-phase buck converter and are part of a module that is separate from the centralized controller. FIG. 1 illustrates only a single phase, but it is understood that in some embodiments, there are multiple phases and multiple modules, each module belonging to a particular phase, and the centralized controller switches the modules on and off according to logic described further herein. Further in some embodiments, the centralized controller and the multitude of modules may all be on the same semiconductor die.

Dead time generator 106 receives the PWM signal and outputs two control signals for each phase of the multi-phase buck converter. Each phase of the synchronous buck converter 110 includes two banks of switch legs 111, and each one of the banks of switch legs corresponds to a respective control signal produced by dead time generator 106. A phase difference between the first control signal and the second control signal affects the timing of operation of the banks of switch legs 111, thereby defining a dead time in synchronous buck converter 110 to avoid or reduce shoot-through and body diode loss.

The two control signals are output from dead time generator 106 and received by switch driver 108. Switch driver 108 includes buffer drivers, which increase a power of each of the control signals in order to provide adequate power to turn on and off the switches 111 within buck converter 110.

Buck converter 110 receives Vinput, which in some embodiments is a power signal from a power rail on a semiconductor die. In other embodiments, Vinput may include power from a battery or other voltage source. The switching legs 111 open and close according to the control signals from switch driver 108. The operation of the switching legs 111, inductor 112, and capacitor 113 provide a steady output voltage at Voutput. Synchronous buck converter 110 may include any synchronous buck converter now known or later developed and may include in some embodiments a conventional synchronous buck converter 110 that reduces the voltage from Vinput according to a duty cycle of the received control signals. If Voutput drops or increases, the change in voltage is seen by PWM controller 102, which adjusts a duty cycle of the PWM signal to return the voltage at Voutput to a desired level. Similarly, I²R power losses within the system 100 of FIG. 1 affect the operation of the feedback loop. Specifically, I²R losses in the system components cause PWM controller 102 to increase the duty cycle of the PWM signal enough to account for those losses.

Figure 2:
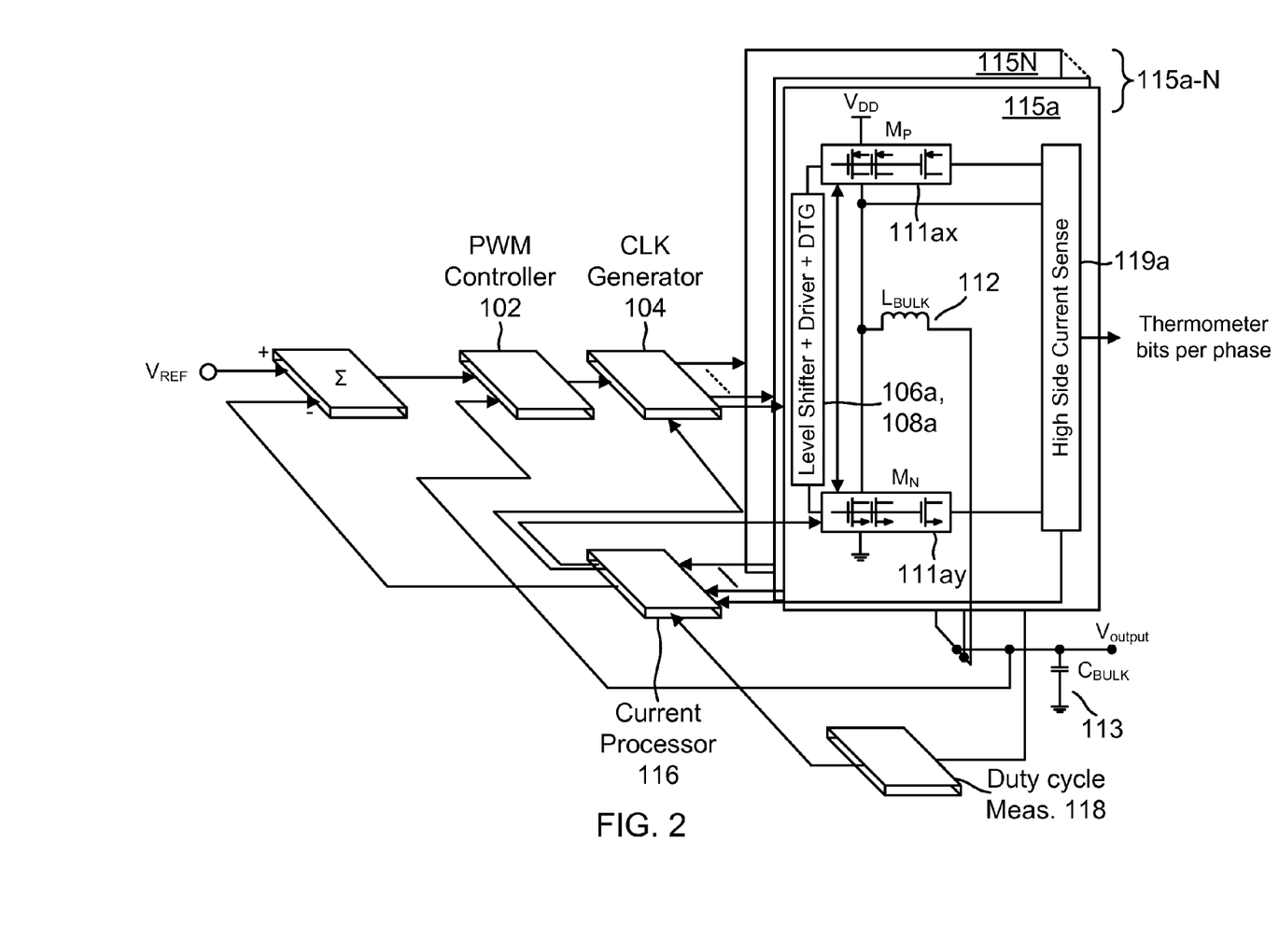
FIG. 2 is an example illustration of another way of implementing the feedback loop of the embodiment of FIG. 1.

FIG. 2 is another way of illustrating the feedback loop of the embodiment of FIG. 1. In FIG. 2, Vinput is shown as VDD. In system on chip (SOC) embodiments, a load (not shown) may include, for example, a processing core, a modem, or the like. However, the scope of embodiments is not limited to SOCs.

FIG. 2 illustrates multiple buck converter phases 115a-N that are individually selectable. For ease of illustration, the following discussion focuses on buck converter phase 115a, but it is understood that each of the individually selectable buck converter phases 115 are substantially similar in structure and have substantially the same ability to be selected or deselected.

Buck converter phase 115a includes two banks of switching legs 111ax and 111ay, which receive the first and second control signals respectively from dead time generator 106 of FIG. 1. Each bank of switching legs 111 is shown having three transistors therein, but it is understood that the scope of embodiments includes banks of switching legs having any appropriate number of transistors. Bank of switching legs 111ax includes PMOS transistors, and bank of switching legs 111ay includes NMOS transistors. Each NMOS transistor corresponds to one respective PMOS transistor, and for each leg that can be selected, that leg includes a corresponding NMOS and PMOS transistor together. Thus, the legs are each in parallel and each leg includes one PMOS and one NMOS transistor. Since the legs are in parallel, more legs allows for more current through the buck converter. Generally, as more current is consumed, more legs can be turned on, and as less current is consumed, legs can be turned off.

Buck converter phase 115a also includes current sensor 119a. The current sensors 119 measure the current at their respective phases and pass information indicating current to current processor 116. Duty cycle measurement 118 measures a duty cycle of the PWM signals that are fed to the transistors in the legs, and passes information indicating the value of the duty cycle back to current processor 116.

Each of the buck converter phases 115 are individually selectable, and each one handles some amount of current. Generally, as the load draws more current, the system can add more phases, and as current consumption by the load goes down, the system can reduce the number of phases that it uses. In this example, clock generator 104 selects phases by turning a clock on to that respective phase. Similarly, clock generator 104 may deselect the phase by turning off the clock to that respective phase. Clock generator 104 acts under control of current processor 116 to select or deselect phases. Current processor 116 itself turns switching legs on and off within the individual phases. Thus, in this example, the buck phases 115 themselves are individually selectable, as are the switching legs within each individual phase 115.

Figure 3:
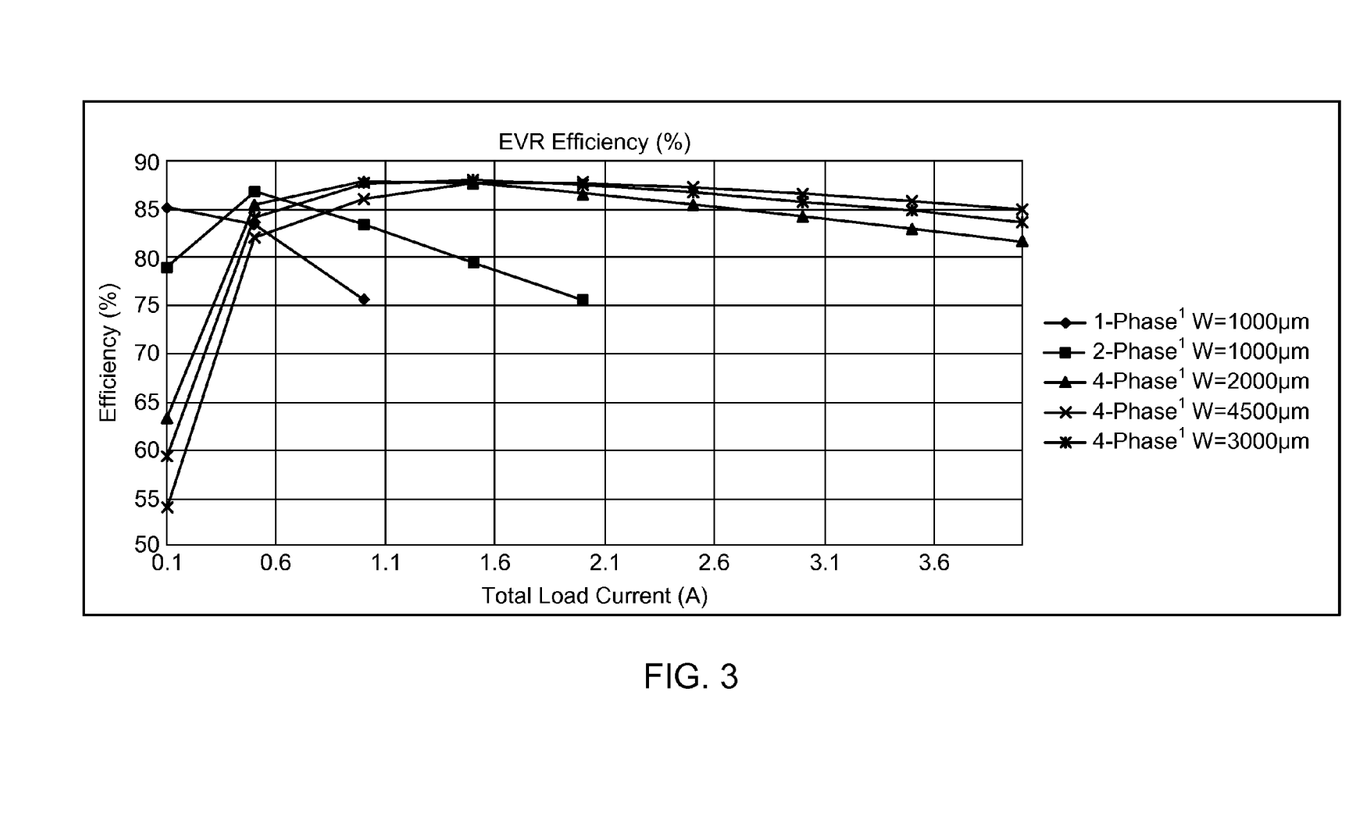
FIG. 3 is an example illustration of a graph that includes a legend on the right-hand side that explains five different discrete phase/leg configuration settings for an example embodiment.

The system of FIGS. 1 and 2 is a PWM system, and PWM may show varying efficiency across a range of load values. FIG. 3 is an illustration of efficiency within the system of FIG. 2 using different phase/leg configuration settings across a range of load values. FIG. 3 illustrates that, especially at low load values, efficiency varies greatly among the different phase/leg configuration settings.

FIG. 3 includes a legend on the right-hand side that explains five different discrete phase/leg configuration settings. For example, the setting listed on top indicates the use of one phase and also indicates "W=1000 μm" In this example, each switching leg is equal to about 500 μm, so the configuration setting listed at the top of the legend indicates that a single phase and two switching legs should be used. Moving down to the example phase/leg configuration setting that is third, it indicates that four phases are used and also "W=2000 μm." Therefore, that configuration setting uses four phases with four switching legs each.

Various embodiments include defining a number of phase/leg configuration settings, where the example embodiment of FIG. 3 has five predefined configuration settings. Each of the configuration settings has different performance parameters associated with load values. For instance, the first phase in the legend has the best efficiency at 85% at a minimum load (a load of 0.1 A), whereas the configuration setting that is second from the bottom in the legend provides the worst efficiency at the minimum load at 55%. Differences in efficiency of operation among each of the configuration settings are known beforehand by modeling and/or testing. For example, the information in the graph of FIG. 3 is known as part of a design of a die or other system before a particular system is manufactured.

Information about each of the different configuration settings at each of the different load levels can be stored to memory, for example within controller 116, using any appropriate data structure, such as a lookup table or the like. In this example, controller 116 is programmed during manufacturing to include information about each of the different configuration settings at each of the different load levels. Further in this example, controller 116 is designed as a state machine so that it selects and applies an appropriate configuration setting as it receives information regarding the value of the load from the current sensors 119.

In one operating example, the current sensors 119 send back current data (which describes load) to processor 116, which aggregates the current sensor information to generate a comprehensive view of the current being drawn by the load. At certain times or periodically, processor 116 uses the value of the load to select an appropriate configuration setting, such as the configuration setting that is known to provide the highest efficiency at the measure of load.

For example, as the system of FIG. 2 is operating circuit 116 determines that the load is drawing 0.5 A, and it uses a lookup table of values to determine that a configuration setting having two phases active and two switching legs per phase is the most efficient configuration setting for that load value. At a later time, operating circuit 116 determines that the load is drawing 2.1 A, so operating circuit 116 uses the lookup table of values to determine that the configuration setting listed second from the bottom of the legend of FIG. 3 provides the highest efficiency, so circuit 116 activates four phases and nine switching legs per phase. Operating circuit 116 repeats the process periodically or at other desirable times to ensure efficient operation as the load varies.

In one embodiment, a switching frequency of the system is 250 MHz, and the current sensors 119 can provide a current measurement every 4 ns. In most situations, that will be much faster than a rate at which the load changes. So it might be wasteful or inefficient to measure current and select a configuration setting during every clock cycle, so some embodiments perform measuring and changing at larger intervals. Of course, the principles described herein can be applied to any appropriate clocking frequency and any appropriate current measurement rate, as those provided in this discussion are examples. Furthermore, the number of phases and number of legs associated with a given efficiency are for example, and it is understood that other systems may include more or fewer predefined configuration settings that are different from those listed here and have different efficiencies at different load values.

Figure 4:
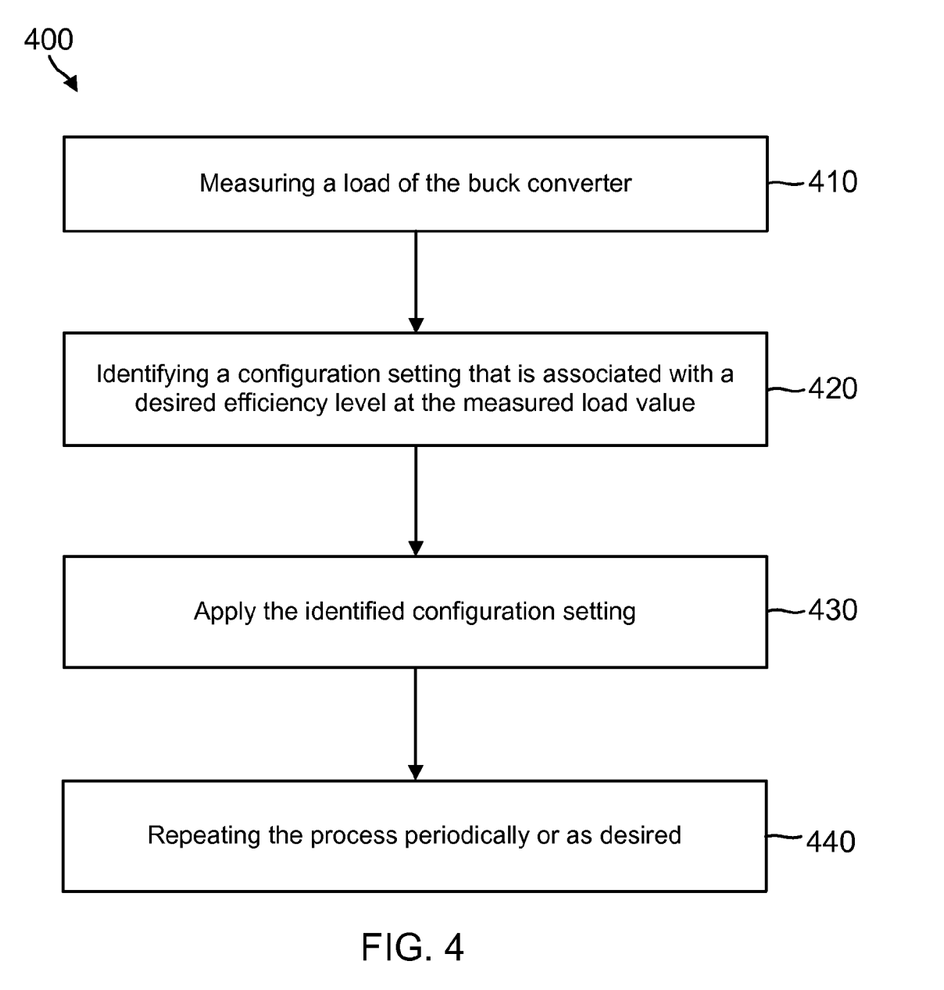
FIG. 4 is an illustration of a flow diagram of an example method of selecting and applying a phase/leg configuration setting.

An advantage of some embodiments is that they may provide high efficiency over a wide range of load values using PWM. Accordingly, some systems may use PWM exclusively and avoid use of pulse frequency modulation (PFM), which may be more difficult to implement in processor systems because of unwanted harmonics and a wide range of frequencies that can be difficult to engineer for. A benefit of some embodiments that use PWM rather than switching between PFM and PWM is eliminating complexity associated with switching back and forth between PWM and PFM and the associated drop in efficiency in the transition range A flow diagram of an example method 400 of selecting and applying a phase/leg configuration setting is illustrated in FIG. 4. In one example, method 400 is performed by a logic circuit, such as controller 116 of FIG. 2, to activate or deactivate a number of switching legs and/or phases in a synchronous buck converter. Method 400 is performed in a system, such as the system of FIGS. 1 and 2, which includes a feedback loop and a synchronous buck converter held at a nearly constant voltage. The buck converter is controlled by a PWM signal, where adjustments in the duty cycle of the PWM signal cause the buck converter to either lower or raise the output voltage. In this example, the logic circuit includes a memory which stores information regarding a plurality of configuration settings along with efficiency information for a range of load values.

At action 410, the logic circuit measures a load of the buck converter. For instance, the logic circuit may receive information from a plurality of current sensors that are associated with individually selectable phases of the buck converter. In this example, current gives an indication of load because the voltage is held at a nearly constant level.

At action 420, the logic circuit identifies a configuration setting that is associated with a desired efficiency level at the measured load value. In one example, the logic circuit identifies a configuration setting that is associated with a highest efficiency level at the measured load value. In embodiments where more than one configuration setting may show a highest efficiency level for the measured load value, the logic circuit may use any appropriate algorithm to select one of the configuration settings. Furthermore, the scope of embodiments is not limited to selecting a configuration setting that is associated with the highest level of efficiency, as other factors may play a role in the selection in other embodiments.

At action 430, the logic circuit applies the identified configuration setting. In the example of FIG. 2, the logic circuit 116 instructs the clock generator 104 to provide clocks to phases that are active according to the identified configuration setting and not provide clocks to phases that are not active. In the example of FIG. 2, the logic circuit 116 turns on a desired number of switching legs within each phase.

At action 440, the logic circuit repeats that process of actions 410 through 430 periodically or as desired. For instance, changes in load may affect the efficiency of a given configuration setting. Accordingly, action 440 provides for identifying and applying an appropriate configuration setting on an ongoing basis as the buck converter operates.

The scope of embodiments is not limited to the specific method shown in FIG. 4. Other embodiments may add, omit, rearrange, or modify one or more actions. For instance, method 400 may be part of a larger feedback operation that holds the buck converter at the nearly constant value (the larger feedback operation is described in more detail above with respect to FIG. 1).

Furthermore, some embodiments may further include adjusting a frequency of the PWM signal. For instance, some methods may include adjusting the clock in harmonic related values. Lowering the switching frequency at odd harmonics in some instances may not change the frequency spectrum, thus RF interference generated by the operation of the system 100 may stay approximately the same. Even harmonics may also be used in some embodiments, since the current waveform is triangular. For low load, lowering the switching frequency in the PWM mode in a controlled manner with the same clock reference may also provide power and efficiency benefits.

It was noted above that in the feedback system 100 of FIG. 1, power losses within the system are compensated for by an increase in the duty cycle of the PWM signal by virtue of the feedback loop keeping Voutput at a nearly constant level. Thus, power losses attributable to inefficient use of the buck converter 110 result in a larger duty cycle of the PWM signal. In addition to, or alternatively to, the embodiments described above using a lookup table and a state machine, various embodiments identify a desirable legs/phase configuration setting by identifying a minimum duty cycle for a given load. Thus, in another example, the system of FIG. 2 periodically tries a plurality of settings and tracks how each of the settings affects the duty cycle of the PWM signal for a given load. The system uses measurement circuit 118 to measure duty cycle. The configuration setting that is associated with the smallest duty cycle for a given load is generally considered to be the configuration setting that is most efficient, and the system may select and apply that configuration setting. The system then re-calibrates using PWM duty cycle minimization periodically or as desired. In the system of FIG. 2, duty cycle measurement circuit 118 may include for example a delay locked loop (DLL) or other appropriate device that measures a pulse width accurately and can report that pulse width to current processor 116. Current processor 116 then uses pulse width information and configuration setting information to pick the configuration setting that minimizes the pulse width.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A voltage regulator comprising:
   a plurality of independently selectable buck converter phases arranged in parallel and configured to provide an output voltage from a supply voltage and to provide the output voltage to a load;
   each of the buck converter phases including a plurality of parallel switching legs configured to receive a pulse width modulated signal from a control system of the voltage regulator, each of switching legs including at least a pair of switches arranged between the supply voltage and a low voltage;

measuring circuitry configured to measure power usage at the load; and a logic circuit in communication with the measuring circuit and configured to receive an indication of power usage at the load from the measuring circuit, the logic circuit further configured to select a setting defining a number of phases and switching legs in response to the indication of power usage at the load.

2. The voltage regulator of claim 1, wherein the measuring circuitry comprises a plurality of current measurement circuits, each of the current measurement circuits being associated with an individual one of the buck converter phases.

3. The voltage regulator of claim 1, wherein the load comprises a processor core.

4. The voltage regulator of claim 1, wherein the load comprises a core in a System on Chip (SOC).

5. The voltage regulator of claim 1, further comprising:
a pulse width modulation (PWM) controller configured to receive the output voltage via a feedback loop and to regulate the pulse width modulated signal in accordance with the output voltage and a reference voltage.

6. The voltage regulator of claim 1, wherein each of the buck converter phases further comprises an inductor in communication with a respective plurality of parallel switching legs.

7. The voltage regulator of claim 1, wherein the logic circuit is configured to activate a given one of the buck converter phases by applying a clock signal to the given one of the buck converter phases.

8. A method comprising:
measuring power consumed at a load of a voltage regulator, wherein the voltage regulator includes a plurality of independently selectable buck converter phases, and each of the buck converter phases includes a plurality of independently selectable switching legs;
in response to measuring the power consumed, selecting a first setting from a plurality of settings, each one of the settings defining a number of active buck converter phases and a number of active switching legs; and
applying the first setting by activating ones of the buck converter phases and activating ones of the switching legs according to the first setting.

9. The method of claim 8, wherein activating ones of the buck converter phases comprises applying a clock signal to the ones of the buck converter phases.

10. The method of claim 8, further comprising:
storing the plurality of settings in a data structure, wherein each of the settings are associated with a respective amount of load current;
wherein selecting the first setting from the plurality of settings includes selecting based on an amount of current indicated by measuring the power consumed at the load.

11. The method of claim 8, further comprising:
storing the plurality of settings in a data structure, wherein each of the data settings are associated with a respective amount of load current;
wherein selecting the first setting from the plurality of settings includes selecting based on an amount of current indicated by measuring the power consumed at the load and a desired efficiency level at the amount of current.

12. The method of claim 8, wherein measuring power consumed at the load comprises:
measuring current consumed by the load.

13. The method of claim 8, wherein measuring power consumed at the load comprises:
at each of the buck converter phases, measuring current provided to the load.

14. The method of claim 8, further comprising:
receiving an indication of an output voltage of the voltage regulator;
adjusting a pulse width modulated (PWM) signal in response to the indication of the output voltage;
providing the PWM signal to ones of the switching legs of the buck converter phases.

15. The method of claim 8, wherein selecting the first setting comprises:
matching an indication of the measured current with an associated one of the settings in a pre-programmed data structure stored at the voltage converter.

16. The method of claim 8, wherein the method is implemented as a state machine by a logic circuit of the voltage converter.

17. A system comprising:
means for measuring power at a load of a buck converter, wherein the buck converter includes a plurality of individually selectable phases, each of the phases including a plurality of individually selectable and parallel switching legs; and
means for selecting a configuration setting for the buck converter in response to measuring the power at the load, wherein the configuration setting is selected from a plurality of configuration settings, each of the configuration settings defining a number of the phases and of the parallel switching legs.

18. The system of claim 17, wherein the means for measuring comprises a plurality of current measurement circuits, each of the current measurement circuits being associated with an individual one of the phases.

19. The system of claim 17, wherein the load comprises a processor core.

20. The system of claim 17, wherein the load comprises a core in a System on Chip (SOC).

21. The system of claim 17, further comprising:
means for receiving an output voltage of the buck converter via a feedback loop and regulating a pulse width modulated signal in accordance with the output voltage and a reference voltage, wherein the pulse width modulated signal is received by the parallel switching legs.

22. The system of claim 17, wherein each of the phases further comprises an inductor in communication with a respective group of the switching legs.

23. The system of claim 17, wherein the means for selecting is configured to activate a given one of the buck converter phases by applying a clock signal to the given one of the buck converter phases.

24. A method comprising:
providing an output voltage to a load by a voltage regulator having a plurality of independently selectable buck converter phases;
measuring a current consumption by the load;
selecting a first setting from a plurality of settings in response to measuring the current consumption, each setting of the plurality of settings defining a number of active buck converter phases and a number of transistor switching legs in each active buck converter phase; and
applying the first setting to the voltage regulator.

25. The method of claim 24, wherein applying the first setting comprises providing a clock signal to the active buck converter phases.

26. The method of claim 24, further comprising:
storing the plurality of settings in a data structure, wherein each of the settings are associated with a respective amount of load current;
wherein selecting the first setting from the plurality of settings includes selecting based on an amount of current indicated by measuring the current consumption.

27. The method of claim 24, wherein measuring the current consumption by the load comprises:
at each of the buck converter phases, measuring current provided to the load.

28. The method of claim 24, further comprising:
receiving an indication of an output voltage of the voltage regulator;
adjusting a pulse width modulated (PWM) signal in response to the indication of the output voltage;
providing the PWM signal to the transistor switching legs of the buck converter phases.

29. The method of claim 24, wherein selecting the first setting comprises:
matching an indication of the measured current consumption with an associated one of the settings in a preprogrammed data structure stored at the voltage converter.

30. The method of claim 24, wherein the method is implemented as a state machine by a logic circuit of the voltage converter.

* * * * *